Jan. 19, 1954     G. F. HAUF     2,666,607
SUPPORT FOR COIN CONTROLLED MACHINES
Filed Oct. 18, 1949     4 Sheets-Sheet 1
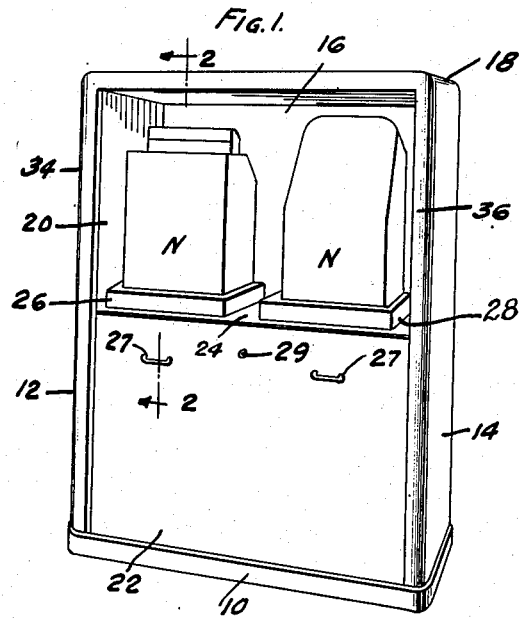
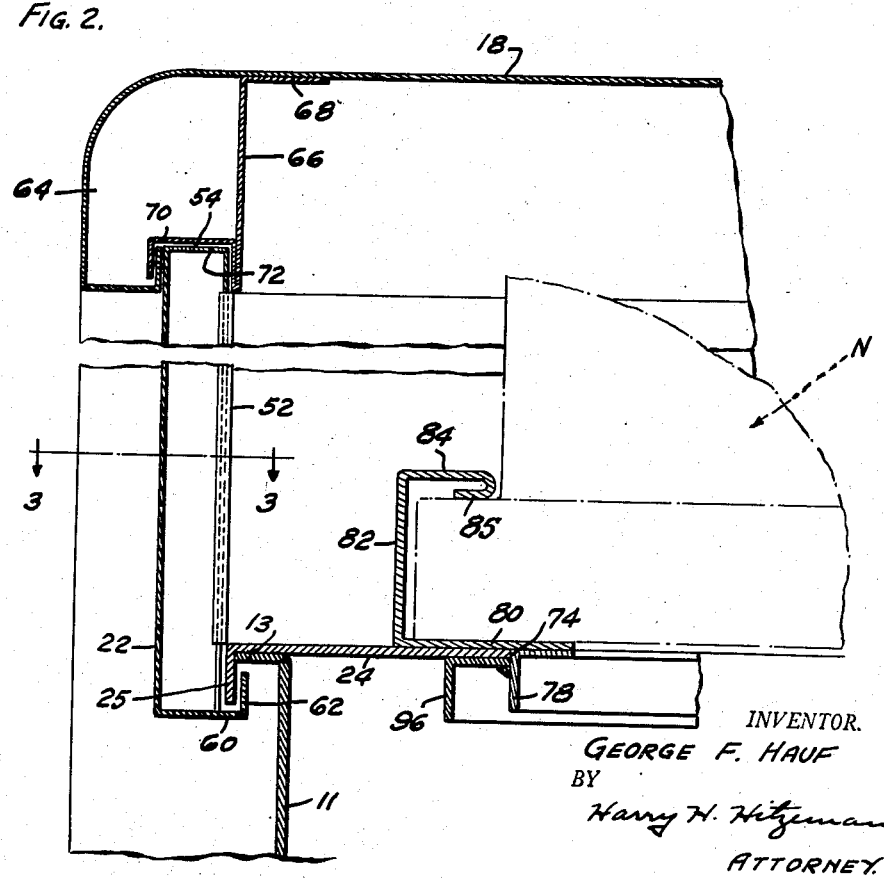
INVENTOR.
GEORGE F. HAUF
BY
Harry H. Hitzeman
ATTORNEY.

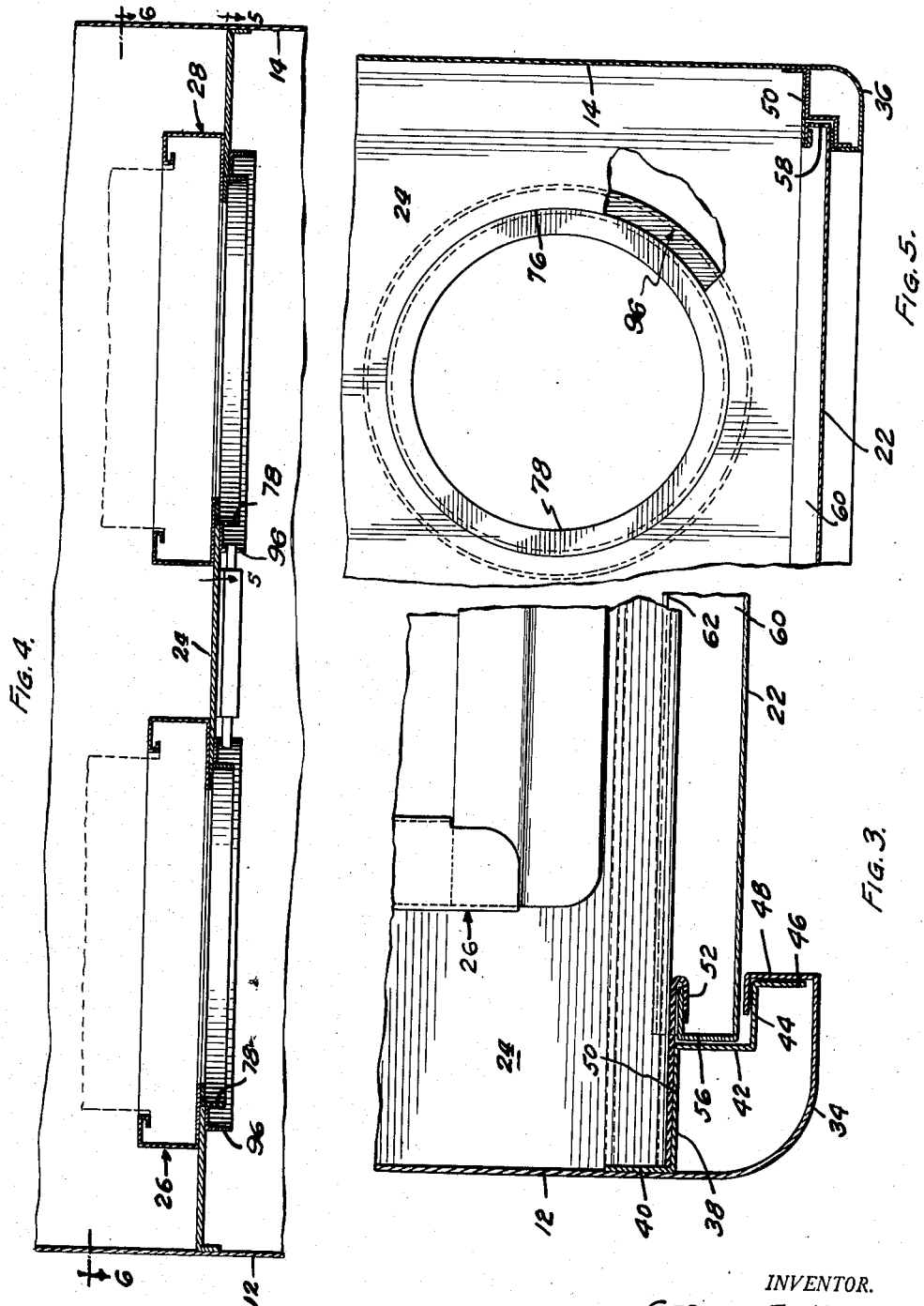

Jan. 19, 1954 G. F. HAUF 2,666,607
SUPPORT FOR COIN CONTROLLED MACHINES
Filed Oct. 18, 1949 4 Sheets-Sheet 3
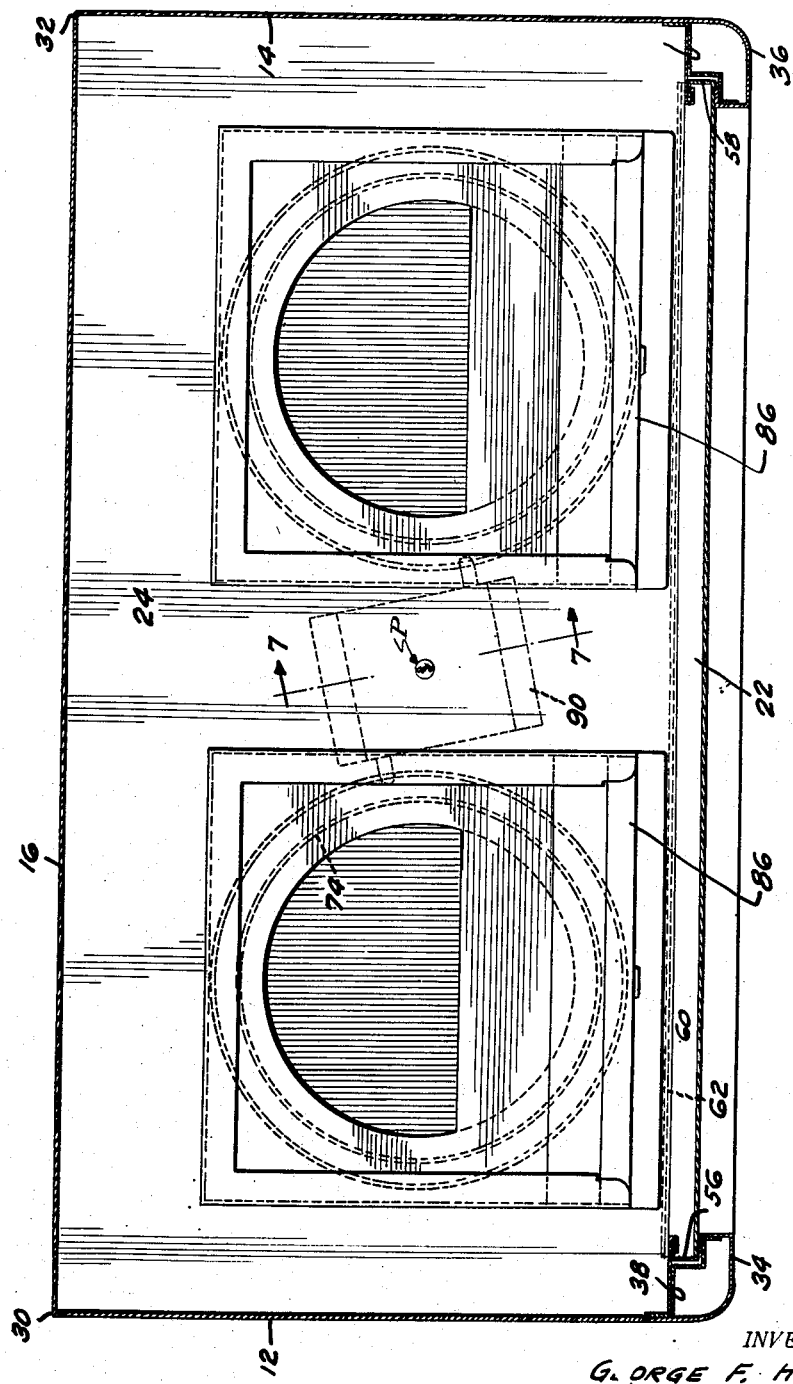
INVENTOR.
GEORGE F. HAUF
BY
Harry H. Hitzeman
ATTORNEY.

Jan. 19, 1954  G. F. HAUF  2,666,607
SUPPORT FOR COIN CONTROLLED MACHINES
Filed Oct. 18, 1949  4 Sheets-Sheet 4

INVENTOR.
GEORGE F. HAUF
BY
Harry H. Hitzeman
ATTORNEY.

Patented Jan. 19, 1954

2,666,607

UNITED STATES PATENT OFFICE 2,666,607

SUPPORT FOR COIN CONTROLLED MACHINES

George F. Hauf, River Forest, Ill., assignor to Chicago Metal Mfg. Co., Chicago, Ill., a corporation of Illinois Application October 18, 1949, Serial No. 122,018

1 Claim. (Cl. 248—131)

My invention relates to cabinets and particularly to theft-resistant cabinets for coin controlled machines.

Theft or unauthorized removal of coin controlled machines of various kinds has become very common and has occasioned considerable loss to operators and owners of such machines. Securing of machines to stands and cabinets of a nature permitting the same to be bodily carried away has been ineffectual and locking of machines to relatively immovable objects has resulted in the locks being opened by means of hammers, chisels, hacksaws, files, prying bars, etc.

The principal object of my invention is to provide a cabinet for coin controlled machines capable of effectively protecting such machines from theft.

A further object is to provide a cabinet adapted for relatively permanent attachment to a wall or the like and having means for locking a machine to the cabinet so protected as to be accessible for use of a key therein but substantially inaccessible for application of tools thereto.

A further object of the invention is to provide such a cabinet wherein a machine is supported by a turntable and is removable from the turntable only when the turntable is in a position other than normal.

A further object of my invention is to provide such a cabinet having locking means appliable to lock the turntable both against removal and against rotation out of its normal position.

A further object of the invention is to provide such a cabinet having closure means preventing access to a machine mounted in the cabinet and the means locking such machine to the cabinet.

Mechanism of this general type is shown in Herman F. Berg Patent No. 2,087,717 issued July 20, 1937, its particular feature residing in the provision of a pivoted turntable on a horizontal platform, the turntable carrying a frame or mounting for a coin-controlled machine, and the turntable being capable of being locked against rotation when in normal position.

The present invention is directed to improvements in construction and operation over that shown in the above patent.

One of the principal improvements herein to be described is the provision of turntable and frame construction capable of easier fabrication and assembly and novel locking means therefor.

A further object is the provision in such construction of easily accessible lock means when the cabinet is open, so that an operator or attendant can easily and quickly either remove and replace coin controlled machines or service them as by refilling them with mechandise or emptying the accumulated coins therefrom.

Other objects and advantages will be more apparent from the following description wherein reference is made to the accompanying drawings upon which Fig. 1 is a front perspective view of a cabinet showing a pair of dispensing machines positioned upon the shelf or platform therein and with the front door in an open position;

Fig. 2 is an enlarged fragmentary section taken generally on the line 2—2 with the door, however, shown in a closed or locking position;

Fig. 3 is a fragmentary plane sectional view taken on the line 3—3 of Fig. 2 through the door and one of the corner posts showing the construction of the cabinet and the manner in which the door is connected thereto;

Fig. 4 is a fragmentary vertical sectional view through the platform of the cabinet showing the manner in which my improved turntable construction is mounted and locked thereon;

Fig. 5 is a fragmentary plane section taken on the line 5—5 of Fig. 4 below the turntable;

Fig. 6 is a plane sectional view on line 6—6 of Fig. 4 through the entire cabinet taken above the turntable;

Figure 8:
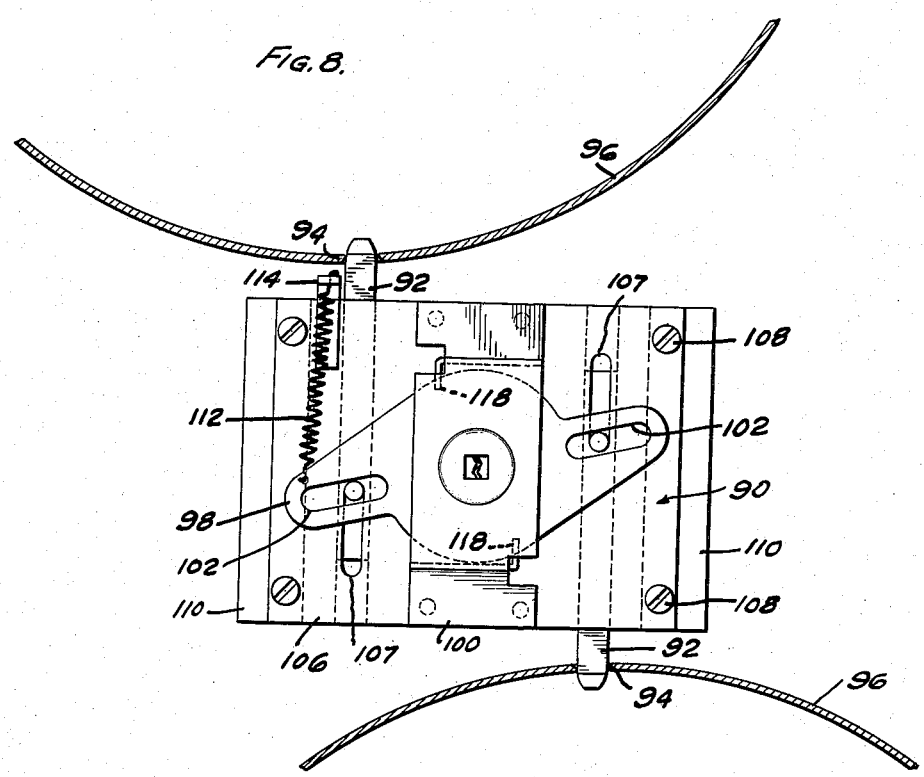
Fig. 8 is a bottom plane view thereof.

In the embodiment of the invention which I have chosen to illustrate and describe the same, the cabinet generally may include a base 10, vertical side walls 12 and 14, back wall 16, a top 18, and an open front 20 capable of being closed by a vertical slidable door 22. The cabinet may also include the horizontal platform 24 upon which a pair of turntables 26 and 28 are mounted, the turntables in turn having a framework to receive coin controlled vending machines N.

As best shown in Figures 2, 3, and 6, the walls 12, 14, and 16 may be formed of a continuous strip of sheet metal. The back corners 30 and 32 are generally square and the forward ends of the walls 12 and 14 terminating in rounded post portions 34 and 36.

At each post I provide a vertical reinforcing ledge 38 having a brace formed with a portion 40 welded to each side wall, a portion 42 extending forwardly, a portion 44 parallel with the front of the machine, and a portion 46 enclosed by a folded-in portion 48 of the posts 34 and 36. I also provide vertical strips 50 welded to the portion 38 and extending inwardly from the post and folded back as at 52 to form a recess for the sides of the door 22.

The door 22 may be constructed of a single strip of sheet metal having its upper and side edges 54, 56, and 58 bent at right angles and then inwardly. The lower edge 60 of the door is also bent at right angles and extended beyond the top and side inturned ledges and is provided with an upturned ledge 62.

The up standing front wall 11 which extends from the base 10 to support the platform 24 is formed with an outwardly turned ledge 13 that sets within a downwardly turned ledge 25 on the front edge of the platform 24. The upper wall 18 of the cabinet is formed generally similar to the post members 34 and 36 having the similarly shaped front portion 64 and a horizontal reinforcing member 66 with a ledge 68 welded to the top and a generally U-shaped portion 70 which cooperates with the member 64 to form a recess 72 to receive the upper end of the door when it is closed.

With this construction it can be seen that when the door is closed the two side edges and the top edge are confined in recesses in the side walls and in the top of the cabinet, the lower edge of the door having a flange 62 which rides up behind the down-turned ledge of the platform 24, thus effectively locking the door in position.

With the above described construction of the cabinet and slidable door, no instrument such as a crowbar or other prying instrument can be introduced at any point and leverage secured to forcibly remove the door. The door is held against removal about its entire perimeter by the welded together sheet metal construction of the cabinet and except for a total bending, twisting and smashing of the entire cabinet, it is not possible to break into the cabinet through the door. Handles 27 may be provided on the door for raising the same and a suitable lock 29 may be provided for locking it at its closed position.

I have provided a pair of turntables 26 and 28 mounted for rotation in the circular openings 74 and 76 of the platform 24. Each of the turntables may be formed by a circular angle-shaped ring member 78 which telescopes in the opening described, the ring member having its upper leg welded to the bottom wall 80 of an open top box-like container 82 which has a flat upper flange 84 having an inturned portion 85. One side of the container is open and is adapted to slidably receive locking bar 86 which is removed to permit the placing of a machine N into the container and is then replaced and the bar is locked in position.

As previously mentioned, a machine of the type described is positioned in the container on one of the turntables and the turntable is rotated 180 degrees so that the locking bar 86 faces the wall 16.

Figure 7:
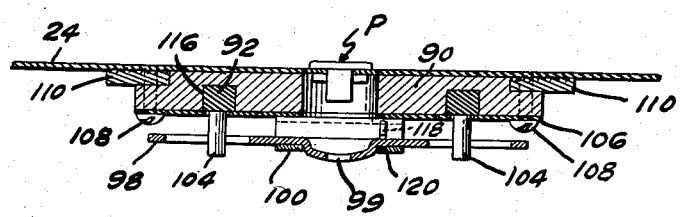
Fig. 7 is a cross-sectional view through the locking mechanism taken on the line 7—7 of Fig. 6.

Means to prevent rotation of the turntables so that the machines can be removed may comprise a locking mechanism 90 (see Figs. 6, 7 and 8) which has a pair of spring-pressed bolt members 92 adapted to engage in openings 94 in a pair of angle-shaped ring members 96 welded or otherwise secured to the ring members 78 beneath the platform 24.

Means for withdrawing the locking bolts 92 may comprise a lever 98 pivoted for rotation in a supporting plate member 100, the lever having a pair of elongated slots 102 which engage downwardly disposed pin members 104 mounted on the bolt member 92.

The plate 100 may be welded or otherwise secured to a cover plate 106 fastened by a plurality of bolt members 108 through the body 90 of the lock member to a pair of strap members 110 that may be welded or otherwise secured to the bottom of the platform 24 in a desired position. Coiled spring 112 is attached to one end of lever 98 and at its other end to a fixed arm 114 mounted on the plate 106. Slots 107 in the plate 106 permit movement of the locking bolts in the grooves 116 of the body 90.

The plate 100 is provided with a pair of inturned ears 118 which lie above the lever 98 and can position it for rotation in the circular opening 120 in the plate. The lever is provided with a key opening 99 so that when the proper key is inserted and rotated clockwise, the bolts 92 will be withdrawn from the openings 94 in the rings 96 and each of the turntables may be rotated.

Prior to the introduction of this lever-operated key, it was necessary to remove the lock member P mounted on the platform 24 to overly the key opening 99. Thus the removal of the lock member permits access to the lever 98.

From the foregoing construction, it can be seen that I have provided an easily operable mechanism for rotating turntables, frames or containers in which vending machines are mounted. Since the usual vending machine is so constructed that the introduction of merchandise or the removal of money therefrom can only be accomplished from the rear of the machine, it is highly desirable that these machines be locked in operative position with access to the merchandise or money in the same impossible. This is best accomplished by locking the vending machine in the position shown in the drawings, making it practically impossible, without the keys for the locking mechanism, to be able to tamper with the money or merchandise in the vending machines.

While I have illustrated and described a specific embodiment of the invention, it will be apparent to those skilled in the art that changes and modifications may be made in the exact details shown, and I do not wish to be limited in any particular; rather what I desire to secure and protect by Letters Patent of the United States is:

A stand for a dispensing machine having a horizontal platform, a pair of aligned circular openings in said platform, a turntable mounted on said platform over each of said circular openings, each of said turntables comprising an open box like member having an inverted horizontally disposed angle ring member secured thereto and rotatable in each of said openings and a lower inverted angle ring member below said platform and secured to said first named ring member to prevent removal of the turntable, each of said inverted ring members having a horizontal and a vertical leg, and a locking mechanism mounted below said platform, said mechanism including a flat lever pivoted with respect to said platform between said circular openings and having a pair of elongated slots therein, a pair of slidable bolt members, a pin on each of said bolt members engaging in each of said slots, each of the lower angle ring members of said turntables having an opening in the vertical leg of the same engaged by one of said bolt members to prevent rotation of said turntable, said lever adapted when rotated to withdraw both of said bolt members from the openings in each of said vertical legs to permit simultaneous rotation of both turntables.

GEORGE F. HAUF.

References Cited in the file of this patent

UNITED STATES PATENTS

| Number | Name | Date |
|--------|------|------|
| 148,455 | Herzog | Mar. 10, 1874 |
| 1,879,359 | Linfert | Sept. 27, 1932 |
| 2,087,717 | Berg | July 20, 1937 |
| 2,171,664 | McFarland | Sept. 5, 1939 |
| 2,182,474 | Hauf | Dec. 5, 1939 |